(12) United States Patent
Evans

(10) Patent No.: US 6,283,440 B1
(45) Date of Patent: Sep. 4, 2001

(54) APPARATUS AND METHOD FOR REGULATING FLUID FLOW WITH A MICRO-ELECTRO MECHANICAL BLOCK

(75) Inventor: John Evans, Marina Del Rey, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/451,621

(22) Filed: Nov. 30, 1999

Related U.S. Application Data

(63) Continuation of application No. PCT/US99/28175, filed on Nov. 29, 1999.
(60) Provisional application No. 60/110,274, filed on Nov. 30, 1998.

(51) Int. Cl.[7] ............................ F04B 35/02; F16K 31/122
(52) U.S. Cl. ..................... 251/11; 251/63; 251/129.01; 417/379
(58) Field of Search ................................. 251/11, 62, 61, 251/63, 129.01, 129.06; 92/130 R, 130 A; 60/325, 326, 721; 417/375, 379

(56) References Cited

U.S. PATENT DOCUMENTS

| | | | |
|---|---|---|---|
| 4,522,698 | 6/1985 | Maget | 204/301 |
| 4,926,906 | 5/1990 | Ichihashi et al. | 137/625.3 |
| 5,150,734 | 9/1992 | Chiba | 137/567 |
| 5,346,372 | 9/1994 | Naruse et al. | 417/379 |
| 5,441,231 | 8/1995 | Payne et al. | 251/5 |
| 5,671,905 | * 9/1997 | Hopkins, Jr. | 251/129.01 |
| 5,865,417 | 2/1999 | Harris et al. | 251/11 |
| 5,992,820 | 11/1999 | Fare et al. | 251/129.01 |
| 6,137,206 | * 10/2000 | Hill | 60/528 X |
| 6,149,123 | * 11/2000 | Harris et al. | 251/11 |

* cited by examiner

Primary Examiner—Kevin Shaver
Assistant Examiner—Eric Keasel
(74) Attorney, Agent, or Firm—Pennie & Edmonds LLP

(57) ABSTRACT

A Micro-Electro Mechanical device includes a movable mechanical structure and a bias mechanism. A bubble confinement region is defined by at least a portion of the movable mechanical structure. A bubble generation mechanism produces a bubble within the bubble confinement region. The bubble displaces the movable structure and alters the configuration of the bias mechanism, thereby producing useful work.

42 Claims, 4 Drawing Sheets

APPARATUS AND METHOD FOR REGULATING FLUID FLOW WITH A MICRO-ELECTRO MECHANICAL BLOCK

This application claims priority to the provisional patent application entitled "Bubble-Controlled Spring Valve", Ser. No. 60/110,274, filed Nov. 30, 1998 and the Patent Cooperation Treaty application entitled "Bubble-Controlled Spring Valve", which is a continuation of PCT/US99/28175, filed Nov. 29, 1999.

This invention was funded by a grant from DARPA, No. F33615-97-1-2730. The U.S. Government may have certain rights in this invention.

BRIEF DESCRIPTION OF THE INVENTION

This invention relates generally to Micro-Electro Mechanical Systems (MEMS). More particularly, this invention relates to a Micro-Electro Mechanical block with controlled movement for regulating fluid flow.

BACKGROUND OF THE INVENTION

Micro-Electro Mechanical Systems (MEMS), which are sometimes called micromechanical devices or micromachines, are three-dimensional objects having one or more dimensions ranging from microns to millimeters in size. The devices are generally fabricated utilizing semiconductor processing techniques, such as lithographic technologies.

Generating effective actuation in a fluidic environment is challenging, as standard MEMS actuation methods are generally ineffective in this environment. For example, electrostatic actuators, such as an electro-static comb drive, will not function with a conducting dielectric, such as water. Thermal actuators, such as thermal bimorph actuators, are of limited value, as the boiling point of the surrounding fluid limits the thermal range of the device. Piezoelectric actuators have been used to some effect in micro-fluidic devices. However, these actuators have limited actuation range and are difficult to fabricate.

It would be highly desirable to generate actuation in a fluidic environment for applications such as flow regulation, stirring, positioning of mirrors within a flow stream, moving cells or biological samples, etc. It would be highly desirable to provide an actuator with large actuation ranges, which requires minimal energy to generate displacement, which requires little or no energy to maintain a given displacement, and which requires minimal energy to return to its initial configuration. Ideally, such an actuator could be constructed using standard MEMS fabrication techniques.

SUMMARY OF THE INVENTION

One embodiment of the invention is a Micro-Electro Mechanical device with a movable mechanical structure and a bias mechanism. A bubble confinement region is defined by at least a portion of the movable mechanical structure. A bubble generation mechanism produces a bubble within the bubble confinement region. The bubble displaces the movable structure and alters the configuration of the bias mechanism, thereby producing useful work.

Another embodiment of the invention is a Micro-Electro Mechanical flow regulator with a moving mechanical structure and a bias mechanism configured to selectively alter the position of the movable mechanical structure, thereby regulating flow.

Still another embodiment of the invention is a Micro-Electro Mechanical flow regulator with an inlet port; an outlet port; a control port; and a mechanical structure selectively obstructing the inlet port in response to a controlled pressure applied to the control port, thereby regulating flow from the inlet port to the outlet port.

Another embodiment of the invention is a method of regulating fluid flow. The method includes the steps of forming a bubble, altering the position of a mechanical structure in response to the bubble, eliminating the bubble, and responding to the eliminating step by changing the position of the mechanical structure, the mechanical structure thereby regulating fluid flow.

Advantageously, the invention establishes a fluid flow regulator with an actuator that has large actuation ranges. The actuator requires minimal energy to generate displacement, requires little or no energy to maintain displacement, and requires minimal energy to return to its initial configuration. Advantageously, the flow regulator of the invention is constructed using standard fabrication techniques.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
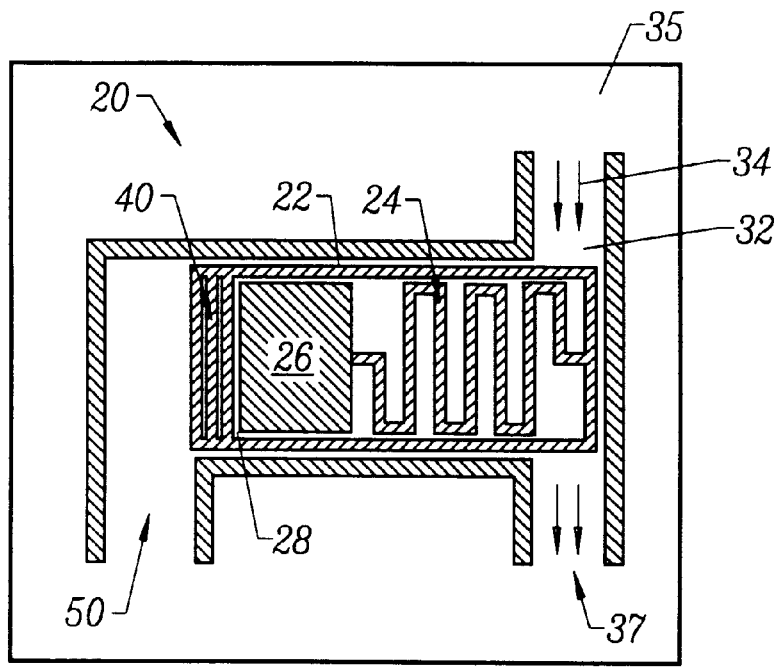
FIG. 1 illustrates a MEM block in a channel obstruction position according to an embodiment of the invention.

FIG. 1 illustrates a MEM block flow regulator 20 in accordance with an embodiment of the invention. As described in detail below, the device is fabricated using semiconductor processing techniques, and is therefore referred to as a Micro-Electro Mechanical System (MEMS). The embodiment of FIG. 1 is sometimes referred to as a bubble-controlled spring valve 20. The valve 20 includes a sliding block 22, which includes a bias mechanism 24. By way of example, and as shown in FIG. 1, the bias mechanism 24 may be a spring formed in silicon. The sliding block 22 moves relative to an anchor 26. In particular, a bubble is generated in a bubble confinement chamber 28 formed between the anchor 26 and the sliding block 22. The bubble forces controlled movement of the sliding block 22, as discussed below.

Figure 2:
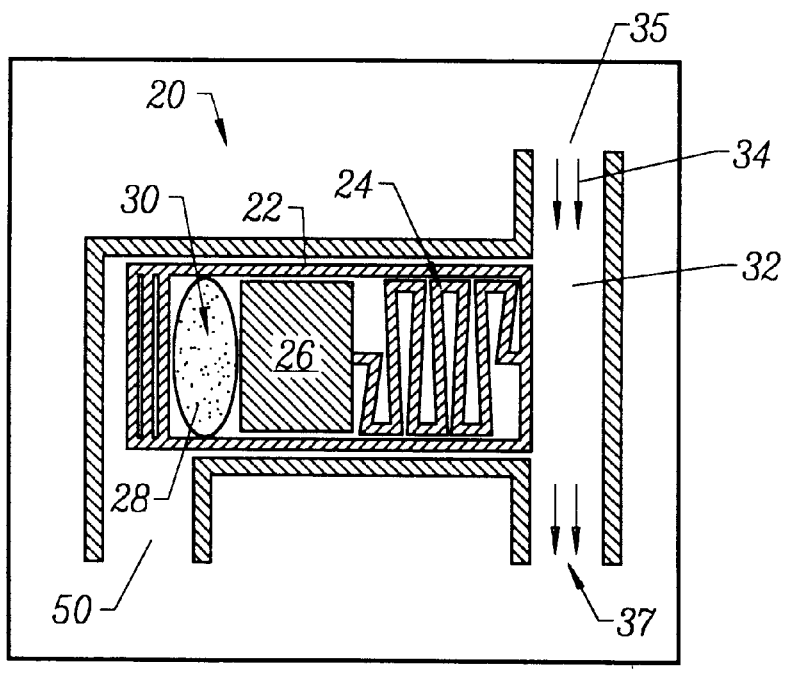
FIG. 2 illustrates a MEM block in an open channel position according to an embodiment of the invention.

FIG. 2 illustrates a bubble 30, which causes the bias mechanism 24 to be compressed as the sliding block 22 moves to an open channel position. In contrast, in FIG. 1, the sliding block 22 is in a channel obstruction position with the bias mechanism 24 in an uncompressed state. The open channel position of FIG. 2 allows a channel 32 to route a fluid, as shown with arrow 34.

Figure 3:
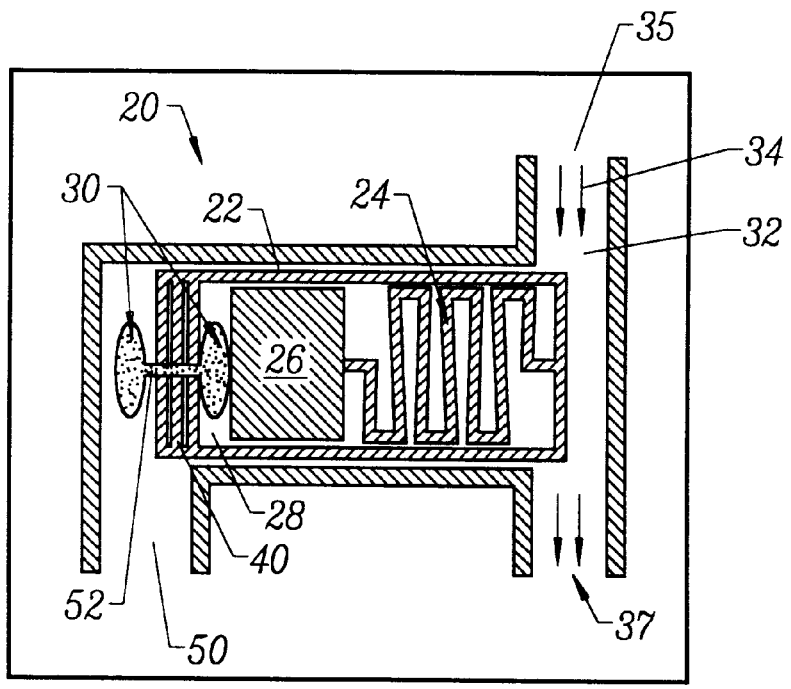
FIG. 3 illustrates a bubble-controlled spring valve releasing a bubble from its bubble confinement chamber in accordance with an embodiment of the invention.

FIG. 3 illustrates the operation of closing the valve 20. A bubble escape path 40 is used to release the bubble 30 from the bubble confinement chamber 28. A bubble evacuation mechanism, such as a heater described below, facilitates a gas phase movement of the bubble out of the bubble confinement chamber 28.

Figure 4:
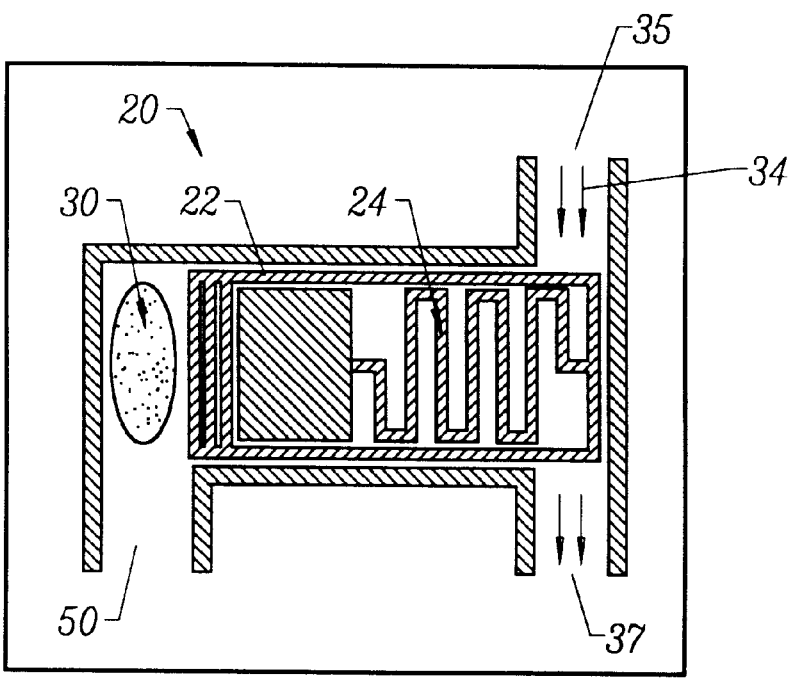
FIG. 4 illustrates a bubble-controlled spring valve that has released a bubble from its bubble confinement chamber in accordance with an embodiment of the invention.

As shown in FIG. 4, once the bubble 30 is removed from the bubble confinement chamber 28, the bias mechanism 24 forces the sliding block 22 into a channel obstruction position. The bubble 30 may then be removed via the dump channel 50.

Observe that the valve of the invention relies upon a two phase cycle. In the first phase, the bubble is generated. As the bubble expands, it performs useful work on the bias mechanism 24, forcing the sliding block 22 into an open channel position. In one embodiment of the invention, the bubble is created using a heater positioned on a substrate above the bubble confinement region. The heat forms a thermal vapor bubble. The thermal vapor bubble continuously evaporates and condenses fluid. As fluid is evaporated and condensed, any dissolved gases in the fluid are evaporated, but do not re-condense. Instead, the dissolved gases remain in gas form within the bubble. Thus, after a period of time, a vapor bubble scavenges dissolved gases from the surrounding fluid. When the heater is turned off, the vapor in the bubble re-condenses, but the previously dissolved gases remain, forming a stable gas bubble. Thus, after a relatively brief period, a stable bubble of formally dissolved gas is formed, and the heater may be turned off.

The bubble confinement chamber is configured such that for the bubble to escape, the bubble must reduce its radius of curvature. Since a reduced radius of curvature represents a higher energy configuration, the bubble remains within the bubble confinement chamber, even when subject to a force from the spring. With this stable bubble in place, the valve is fixed in the open configuration, and requires little or no additional energy.

Embodiments of the invention establish bubble confinement through an arrangement of mechanical structures. However, those skilled in the art will appreciate that other methods can confine or enhance the confinement of bubbles within a bubble confinement region. For example, a bubble confinement region can be defined with a temperature field. In this case, the Marangoni effect is used to constrain the bubble within the bubble confinement region. As a second example, confinement is achieved by selective placement of materials having differing gas-liquid-solid contact angles. For example, an area surrounding the bubble confinement region has a coating that is more hydrophilic than the area within the bubble confinement region. For a bubble to expand into this hydrophilic region, it must decrease its radius of curvature. Since a reduced radius of curvature represents a higher energy configuration, the bubble remains within the bubble confinement region. Each such method results in a confinement mechanism which holds the bubble within the confinement region even when subject to a force, such as that generated by the bias mechanism (e.g., spring).

Those skilled in the art will also appreciate that other methods, such as electrolysis or chemical reactions, can also be used to form a stable bubble. For example, any of a large class of solid reactants can be placed within the bubble confinement chamber, such that when a complementary class of solutions flows through the chamber, a gas producing reaction ensues that results in the formation of a bubble. Alternately, platinum leads can be patterned in the bubble confinement chamber to generate bubble producing electrochemical reactions, such as electrolysis. Each such technique forms a stable bubble that does not require significant additional energy to keep the valve in its opened or closed state.

The second phase of the cycle employs the bubble escape path to defeat the operation of the bubble confinement chamber. The escape of the bubble through the bubble escape path may be initiated automatically in response to conditions within the flow, or in response to external stimuli. For example, in one embodiment, the device is designed so that the operation of the bubble confinement region is defeated when the motion of the fluid exerts sufficient pressure on the movable structure so as to compress the bubble and thereby sufficiently decrease the radius of curvature of the bubble's surface so as to allow the bubble to escape from the bubble confinement region. Alternately, the operation of the bubble confinement region is defeated when the bubble is caused to grow to a sufficient size that it no longer is contained within the bubble confinement region, and the bubble confinement region is unable to physically expand further. In this case, the addition of gaseous material to a volumetrically constrained bubble increases the pressure within the bubble, decreases the radius of curvature of the bubble's surface, and allows the bubble to escape from the bubble confinement region. In both cases, once the mechanism of the bubble confinement region has been defeated, the bias mechanism forces the bubble through the escape path by applying pressure upon the bubble's surface. In another embodiment, bubble escape is achieved with a heater shaped as a bubble escape path. For example, a heater shaped roughly as the path 52 of FIG. 3 may be used. In this example, the heater is positioned on a substrate over the bubble escape path 40 and the dump channel 50. The heater creates a vapor path from the bubble confinement chamber to the dump channel 50. The vapor path may be a formally fabricated path in the sliding block 22, or it may be a clearance region between the sliding block and the substrate over the sliding block.

Observe that a small amount of energy is required to initially form the bubble. However, once the bubble is formed, energy input is generally not required. That is, in most cases the valve remains in an open channel position without energy input. In some cases, the gas bubble requires small amounts of energy. Gas will slowly diffuse back into the surrounding fluid. To keep the bubble the same size over long periods of time, small amounts of energy are required to offset this diffusion.

To dissipate the bubble, only a small amount of energy is required to create the bubble evacuation path. After the bubble is evacuated to the dump channel 50, the bias mechanism 24 places the valve in a channel obstruction position that does not require energy input.

The valve depicted in FIGS. 1–4 may also be used in a second mode which does not require the use of a bubble. In operation, a high pressure is applied to the fluid input region 35 and a low pressure is applied at the fluid output region 37. The flow of fluid from the input to the output can then be regulated by setting the pressure and flow conditions applied to the bubble dump 50. If a high pressure is applied at the dump 50, fluid flows from the dump 50 to the output 37. The drag induced by this flow upon the moving block 22, and independently, the pressure differential between the valve chamber and the dump, causes the structure to remain closed, inhibiting the flow from the input 35 to the output 37 (e.g., the closed state shown in FIG. 1). However, if a low pressure is applied at the dump 50, then fluid flows from the input 35 to the dump 50. The drag induced by this flow upon the moving block 22, and independently, the pressure differential between the valve chamber and the dump, causes the moving block 22 to open, at least partially, against the action of the bias mechanism 24, and permits increased flow from the input 35 to the output 37. In this mode of operation, a combination of a movable structure and a bias mechanism act in such a manner that the pressure and flow conditions at the dump cause a regulation of the flow between the input and the output.

Figure 5:
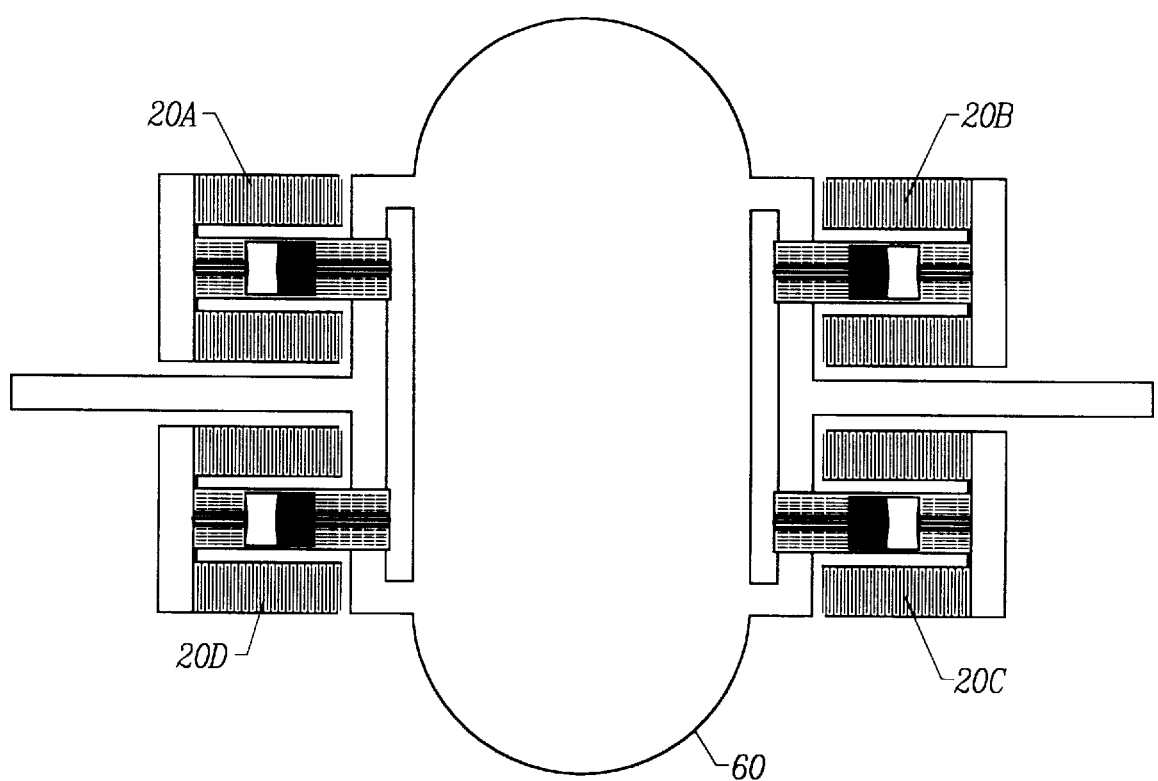
FIG. 5 illustrates a set of MEM blocks used in connection with a mixing chamber.

FIG. 5 illustrates four MEM block flow regulators 20A, 20B, 20C and 20D. Each block or valve is individually operable to control fluid mixing in mixing chamber 60. The operation of a mixing chamber 60 is described in U.S. Ser. No. 08/999,597, filed Jan. 23, 1998, which is expressly incorporated by reference herein.

The device of the invention may be constructed with two wafers: one quartz and one silicon. The electrical components, such as wires and heaters, are fabricated on the quartz wafer using a four mask process. Quartz is preferable because it is stable at temperatures in excess of 1000° C. and is therefore compatible with polysilicon depositions and anneals, while being transparent, thus, allowing one to visualize flow in the channels. Channels, fluidic interconnects, and fluidic components are etched into a silicon wafer using a two mask process. Preferably, the silicon wafer is actually a Silicon on Insulator (SOI) wafer, which has a thin oxide layer buried between 20 and 100 microns below the surface of the wafer. SOI wafers allow one to create released, movable structures, such as valves, while also providing a buried etch-stop that allows more precise control over the depth of fluid channels.

The two dice are bonded using a patterned polymer "gasket" layer, and attached and wire bonded to a copper printed circuit board. Finally, a tubing structure is glued to the silicon dice, thereby completing the fluidic interconnects. This general overview of the fabrication of the device will be supplemented with the following detailed description.

The fabrication process for the quartz cover plate requires a four mask process. First, shallow grooves are etched into the quartz wafer, forming troughs into which wires and heaters can be placed (Mask 1). Etching these grooves keeps the tops of heaters and wires below the level of the wafer surface, thus providing a better surface for subsequent bonding. A plasma may be used to etch the quartz. Alternately, a hydrofluoric acid etch may be used.

Approximately 3000 Å A of doped polysilicon is then deposited using Low Pressure Chemical Vapor Deposition (LPCVD). This layer is then annealed at 9500° C. for one hour. The precise thickness of the layer is adjusted before each run to achieve a layer with a resistance of approximately 25 Ohms per square meter.

The polysilicon layer is then patterned (Mask 2) to form heaters using wet silicon etchant. After a dip in Hydrofluoric acid, approximately one-half micron of Aluminum/2% silicon is then sputtered onto the wafer, patterned (Mask 3), and etched using wet aluminum etchant. The wafers are then manually wiped clean to remove the final monolayer of silicon. Finally, a thin layer of approximately one-half micron of Low Temperature Oxide (LTO) is then deposited using LPCVD at 400° C. This layer forms a passivation layer that prevents electrical components from coming into contact with fluid.

Figure 6:
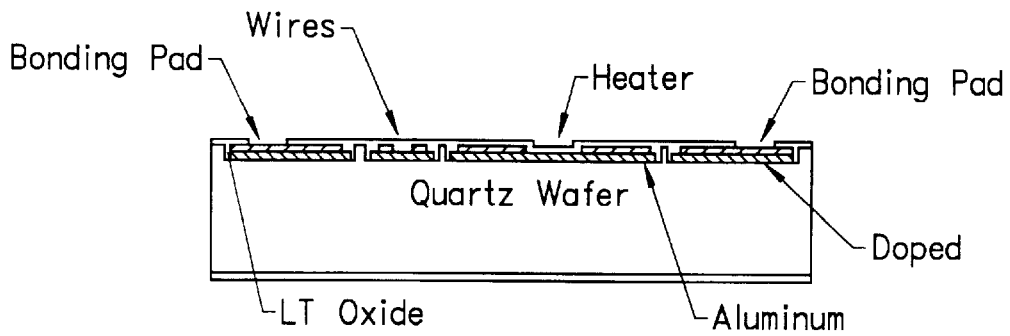
FIG. 6 is a cross-sectional view a quartz wafer substrate that may be used to construct the apparatus of the invention.

Electrical bond pads are formed by etching vias through this layer with a plasma, stopping on the aluminum layer (Mask 4). FIG. 6 illustrates the completed quartz substrate.

There are several commonly encountered fabrication problems that can be addressed with appropriate design. First, when looking through the wafer from the back side, the aluminum layer appears much brighter than other layers, thereby making visualization difficult. Second, in operation, the polysilicon heaters can easily become hotter than the melting point of the aluminum wires, thereby making the electrical connection between the aluminum layer and polysilicon layer prone to failure. Third, fabrication errors in the aluminum layer can create gaps in the aluminum wires, making the connected components useless. All three of these problems were addressed in later fabrication runs by extending the polysilicon layer under nearly all of the aluminum layer. All wires consist of wide polysilicon components with a slightly narrower aluminum component on top. This design decreases apparent brightness of the aluminum layer when viewed through the quartz wafer, ensures good contact between polysilicon and aluminum layers, and provides a fail-safe against small gaps in the aluminum wires.

Around the bond pads, other problems necessitate a different strategy. Here, the main concern is that both the polysilicon and aluminum layers (and the aluminum bond wires) will simultaneously come into contact with fluid during the assembly process. If this occurs, the elecrochemical reactions will cause a rapid degradation of the aluminum layer. To prevent this, in the area of the bond pads the aluminum layer should overlap the polysilicon layer completely, and vias through the LTO passivation layer should not open up connections to the polysilicon layer.

Fabrication of the silicon wafer, which contains the fluid channels, valve structures, and fluid interconnects, requires two mask steps. Typically, a Silicon on Insulator (SOI) wafer, containing a thin buried oxide layer is used, as the buried oxide layer serves as an etch stop when etching the fluid channels, and can also be etched away to form released, movable structures. By way of example, the fabrication runs were conducted using SOI wafers with a 525 microns silicon "handle" layer, a one-half micron "buried" oxide layer, and a 25 micron silicon "process" layer.

The wafer is preferably marked for front-side-back-side alignment targets. Through-holes are patterned (Mask 5) on the back side of the wafer using approximately eight microns of photoresist, which is then etched to the buried oxide layer. The photoresist is then stripped, the wafer cleaned, and a brief wet hydrofluoric acid etch is performed to remove the buried oxide layer when exposed to an etchant. The channel/valve pattern is then applied to the front side of the wafer (Mask 6), the wafer is photoresist-bonded to a handle wafer, and then the channel/valve pattern is etched 25 microns, again stopping on the buried oxide layer.

Figure 7:
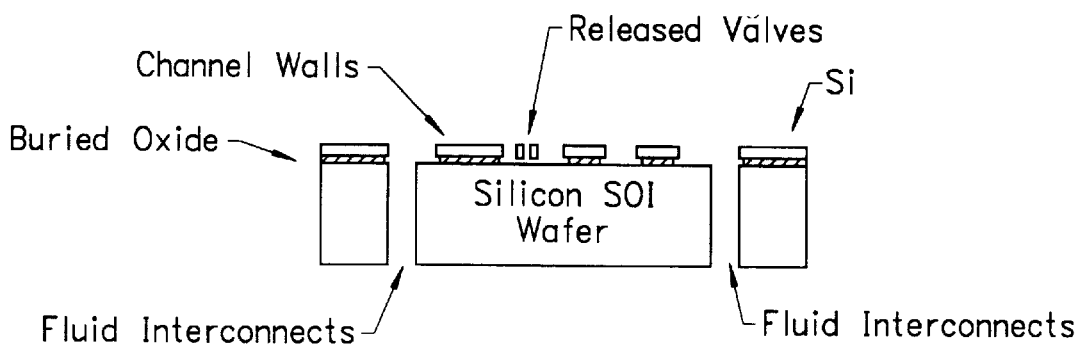
FIG. 7 is a cross-sectional view of a silicon on wafer substrate that may be used to construct an apparatus of the invention.

The photoresist is then stripped, the handle wafers removed, and the wafers rinsed, but not dried. Drying the wafers can easily destroy any fragile valve structures. A thick layer of photoresist is applied while slowly spinning the wet wafers. The wafer is then diced, using the thick photoresist layer to protect the valve structures. The photoresist is then stripped using acetone, the dice are rinsed in isopropyl alcohol and de-ionized water, and they are then HF etched to release the valve structures. The finished dice are then gently dried using a heat lamp or microscope light. A diagram of the completed die is shown in FIG. 7.

The two substrates are assembled as follows. First, a layer of negative photoresist is applied to the quartz die and patterned (Mask 7), forming an "O-Ring" type seal around each of the fluid channels. The quartz and silicon dice are then aligned, pressed together, and heated to about 160° C. using a flip-chip bonding system, thereby reflowing the negative photoresist and forming sealed fluid channels. The device is then placed on a small section of dicing tape (quartz down), and epoxy is pushed up along two sides of the dice (the sides without electrical connectors), forming a stronger mechanical bond. After the epoxy hardens, the dicing tape is pealed away, leaving small tabs of epoxy on two ends.

This two-dice sandwich is then epoxy mounted to a two-sided copper printed circuit board using the epoxy tabs as handles. The dice are mounted quartz side down, so that the electrical bond-pads on the quartz die, and the fluidic interconnects on the silicon die, both face up. Fluid within the device is visualized by looking up through a hole in the PC Board, and into the device. Aluminum wire-bonds are then made between the bond-pads on the quartz die and the copper traces on the PC board, and the wirebonds are encased in epoxy.

Figure 8:
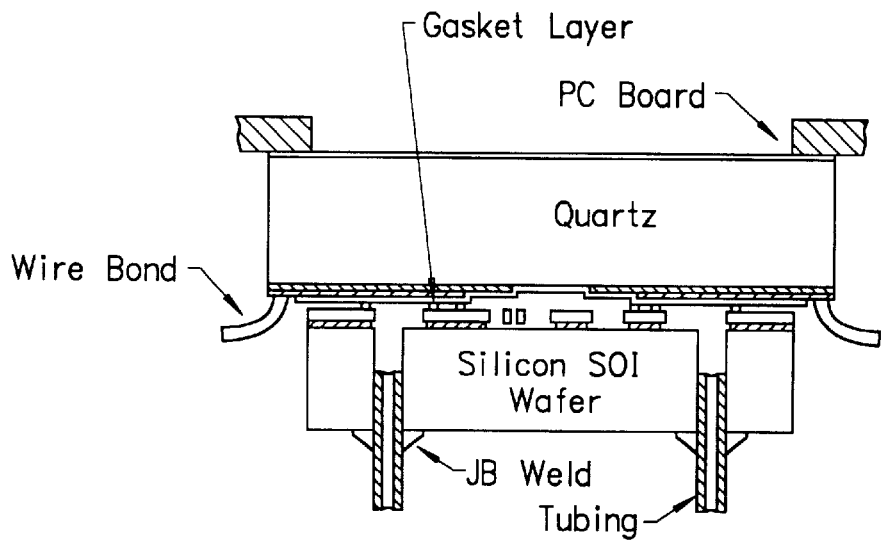
FIG. 8 is a cross-sectional view of a MEM block flow regulator constructed in accordance with an embodiment of the invention.

Next, fluidic interconnects are formed by gluing one inch Polyimide tubes into the interconnect holes on the silicon die using an epoxy (e.g., JB Weld brand engine-block epoxy). Once glued in place, polyethylene tubing and Luer fittings are attached to the Polyimide tubes using small sections of heat-shrink tubing. Finally, magnetic tape is applied to the PC board to mount the device to the probe station during testing. The PC board may be connected to electrical components using edge board connectors, and the fluidic connectors may be attached to syringes, valves, or tubing, as desired, using standard Luer fittings. The assembled device is shown in FIG. 8.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A Micro-Electro Mechanical device, comprising:
a movable mechanical structure;
a bias mechanism;
a bubble confinement region defined by at least a portion of said movable mechanical structure; and
a bubble generation mechanism to produce a bubble within said bubble confinement region, said bubble displacing said movable structure to produce useful work, while altering the configuration of said bias mechanism, wherein said bias mechanism alters the position of said movable mechanical structure after said bubble is evacuated from said bubble confinement chamber.

2. The Micro-Electro Mechanical device of claim 1 wherein said bubble confinement region is configured such that for said bubble to escape said bubble confinement region, said bubble must decrease its radius of curvature.

3. The Micro-Electro Mechanical device of claim 1 wherein said bubble confinement region includes mechanical structures to establish bubble confinement.

4. The Micro-Electro Mechanical device of claim 1 wherein said bubble confinement region includes surfaces that produce different contact angles for said bubble and thereby facilitate bubble confinement.

5. The Micro-Electro Mechanical device of claim 1 wherein selective operation of said bubble generation mechanism forces said bubble to escape from said bubble confinement region.

6. The Micro-Electro Mechanical device of claim 1 wherein said bubble generation mechanism includes a heater.

7. The Micro-Electro Mechanical device of claim 1 wherein said movable mechanical structure regulates fluid flow.

8. The Micro-Electro Mechanical device of claim 1 further comprising a bubble evacuation mechanism to facilitate vapor phase movement of said bubble from said bubble confinement region.

9. The Micro-Electro Mechanical device of claim 8 wherein said bubble evacuation mechanism includes a heater.

10. The Micro-Electro Mechanical device of claim 1 wherein said movable mechanical structure is a sliding block.

11. The Micro-Electro Mechanical device of claim 10 wherein said bias mechanism is a spring.

12. The Micro-Electro Mechanical device of claim 11 further comprising an anchor positioned within said sliding block, said bubble confinement chamber being defined between said sliding block and said anchor.

13. A Micro-Electro Mechanical device, comprising:
a movable mechanical structure;
a bias mechanism;
a bubble confinement region defined by at least a portion of said movable mechanical structure; and
a bubble generation mechanism to produce a bubble within said bubble confinement region, said bubble displacing said movable structure to produce useful work, while altering the configuration of said bias mechanism, wherein said bubble confinement region is configured such that for said bubble to escape said bubble confinement region, said bubble must decrease its radius of curvature.

14. The Micro-Electro Mechanical device of claim 13 wherein said bubble confinement region includes mechanical structures to establish bubble confinement.

15. The Micro-Electro Mechanical device of claim 13 wherein said bubble confinement region includes surfaces that produce different contact angles for said bubble and thereby facilitate bubble confinement.

16. The Micro-Electro Mechanical device of claim 13 wherein selective operation of said bubble generation mechanism forces said bubble to escape from said bubble confinement region.

17. The Micro-Electro Mechanical device of claim 13 wherein said bubble generation mechanism includes a heater.

18. The Micro-Electro Mechanical device of claim 13 wherein said movable mechanical structure regulates fluid flow.

19. The Micro-Electro Mechanical device of claim 13 further comprising a bubble evacuation mechanism to facilitate vapor phase movement of said bubble from said bubble confinement region.

20. The Micro-Electro Mechanical device of claim 19 wherein said bubble evacuation mechanism includes a heater.

21. The Micro-Electro Mechanical device of claim 13 wherein said movable mechanical structure is a sliding block.

22. The Micro-Electro Mechanical device of claim 21 wherein said bias mechanism is a spring.

23. The Micro-Electro Mechanical device of claim 22 further comprising an anchor positioned within said sliding block, said bubble confinement chamber being defined between said sliding block and said anchor.

24. A Micro-Electro Mechanical device, comprising:
   a movable mechanical structure;
   a bias mechanism;
   a bubble confinement region defined by at least a portion of said movable mechanical structure; and
   a bubble generation mechanism to produce a bubble within said bubble confinement region, said bubble displacing said movable structure to produce useful work, while altering the configuration of said bias mechanism, wherein selective operation of said bubble generation mechanism forces said bubble to escape from said bubble confinement region.

25. The Micro-Electro Mechanical device of claim 24 wherein said bubble confinement region includes mechanical structures to establish bubble confinement.

26. The Micro-Electro Mechanical device of claim 24 wherein said bubble confinement region includes surfaces that produce different contact angles for said bubble and thereby facilitate bubble confinement.

27. The Micro-Electro Mechanical device of claim 24 wherein said bubble generation mechanism includes a heater.

28. The Micro-Electro Mechanical device of claim 24 wherein said movable mechanical structure regulates fluid flow.

29. The Micro-Electro Mechanical device of claim 24 further comprising a bubble evacuation mechanism to facilitate vapor phase movement of said bubble from said bubble confinement region.

30. The Micro-Electro Mechanical device of claim 29 wherein said bubble evacuation mechanism includes a heater.

31. The Micro-Electro Mechanical device of claim 26 wherein said movable mechanical structure is a sliding block.

32. The Micro-Electro Mechanical device of claim 31 wherein said bias mechanism is a spring.

33. The Micro-Electro Mechanical device of claim 32 further comprising an anchor positioned within said sliding block, said bubble confinement chamber being defined between said sliding block and said anchor.

34. A Micro-Electro Mechanical device, comprising:
   a movable mechanical structure;
   a bias mechanism;
   a bubble confinement region defined by at least a portion of said movable mechanical structure;
   a bubble generation mechanism to produce a bubble within said bubble confinement region, said bubble displacing said movable structure to produce useful work, while altering the configuration of said bias mechanism; and
   a bubble evacuation mechanism to facilitate vapor phase movement of said bubble from said bubble confinement region.

35. The Micro-Electro Mechanical device of claim 34 wherein said bubble confinement region includes mechanical structures to establish bubble confinement.

36. The Micro-Electro Mechanical device of claim 34 wherein said bubble generation mechanism includes a heater.

37. The Micro-Electro Mechanical device of claim 34 wherein said movable mechanical structure regulates fluid flow.

38. The Micro-Electro Mechanical device of claim 34 wherein said movable mechanical structure is a sliding block.

39. The Micro-Electro Mechanical device of claim 38 wherein said bias mechanism is a spring.

40. The Micro-Electro Mechanical device of claim 39 further comprising an anchor positioned within said sliding block, said bubble confinement chamber being defined between said sliding block and said anchor.

41. The Micro-Electro Mechanical device of claim 38 wherein said bubble confinement region includes surfaces that produce different contact angles for said bubble and thereby facilitate bubble confinement.

42. The Micro-Electro Mechanical device of claim 41 wherein said bubble evacuation mechanism includes a heater.

* * * * *